H. HASTINGS.
FLUID GAGE.
APPLICATION FILED AUG. 13, 1914.
1,126,997.
Patented Feb. 2, 1915.
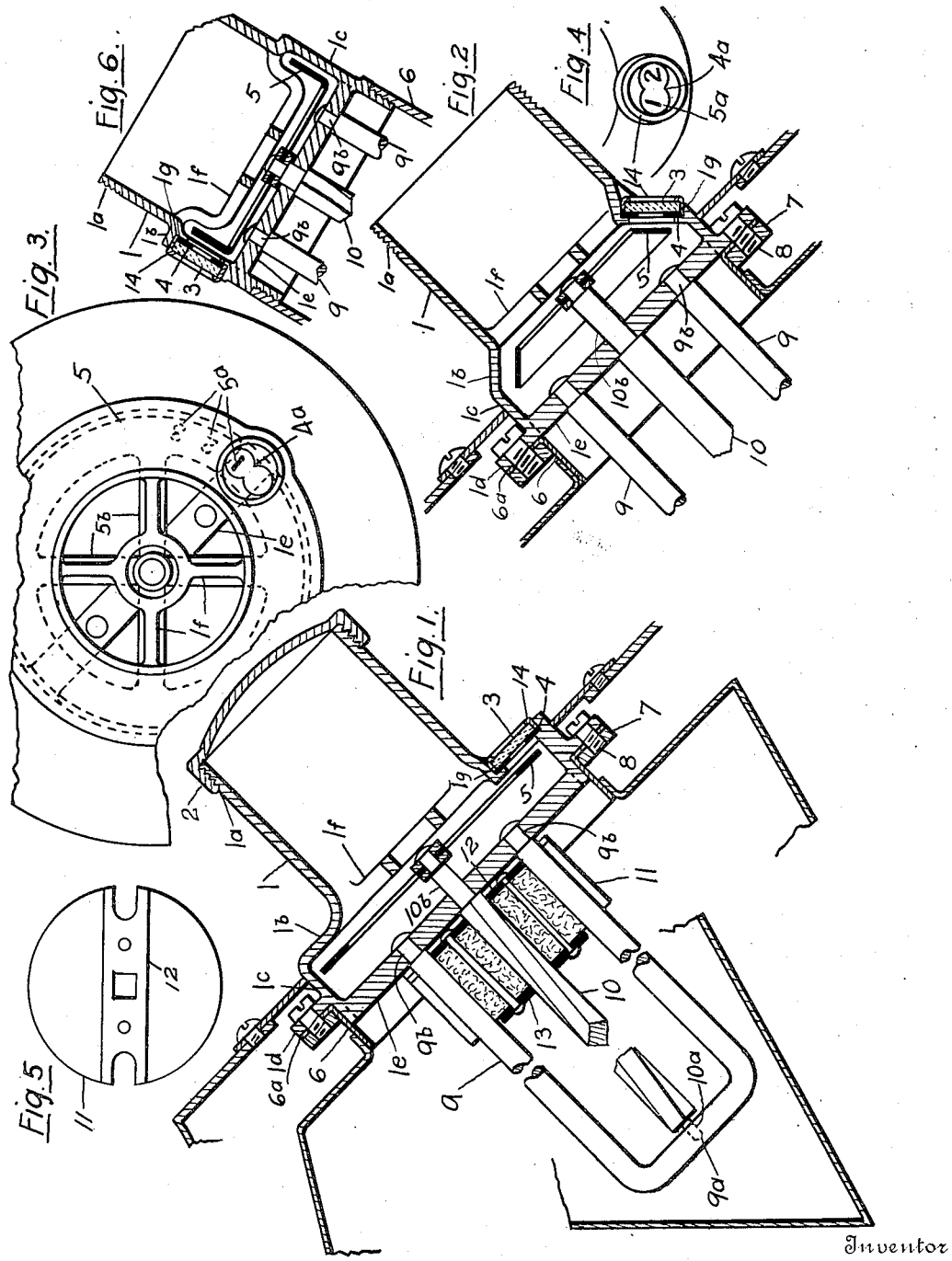
Witnesses
Ralph J. Sexton
Eugene W. Schueler
Inventor
Herbert Hastings

UNITED STATES PATENT OFFICE.

HERBERT HASTINGS, OF BRIGHTON, NEW YORK.

FLUID-GAGE.

1,126,997.   Specification of Letters Patent.   Patented Feb. 2, 1915.

Application filed August 13, 1914. Serial No. 856,629.

*To all whom it may concern:*

Be it known that I, HERBERT HASTINGS, citizen of the United States, residing at Brighton, in the county of Monroe and State of New York, have invented certain new and useful Improvements in Fluid-Gages, of which the following is a specification.

My invention relates to improvements in fluid gages for constantly indicating the depth or amount of fluid in a receptacle and particularly adapted for use in cowl tanks of automobiles, with the indicator mounted upon the instrument board or dash of the car, also for use upon tanks variously mounted and for varied service.

The gage of my present invention, is an improvement over the gage for which Letters Patent were issued to me on September 24th, 1912, Number 1039280, in that the indicator in my present invention is designed to indicate, during the process of filling, the amount of liquid in the tank as well as at other times.

Other objects of my invention are; the combining of the gage with the filler fixture of a tank; the accomplishing of a design which adapts the gage to mounting so that the visual to the indicator, may be placed upon the instrument board; the simplifying of the gage to more economical manufacture.

The above objects in the spirit of my invention, might be attained in many different ways and combination of parts. I prefer to show however, the construction illustrated in the drawings, in which—

Figure 1 is a longitudinal view partly in section, taken through the center of the gage and shows broken sections of the tank to which it is attached and also of the cowel and instrument board. Fig. 2 is a similar view of a gage constructed in accordance with my invention but in slightly different form from that shown in Fig. 1 and shows a portion of the gage as broken away. Fig. 3 is a partial plan view of the gage shown in Fig. 1 with the cap removed. Fig. 4 is a detached, broken view of the visual window of the gage shown in Fig. 2. Fig. 5 is a plan view of the float shown in Fig. 1. Fig. 6 is a longitudinal view partially in section, of a gage embodying my invention, showing another modification in form and method of attaching to the tank collar.

Like reference characters refer to like parts in the different views.

—1— is the combined filler collar and gage body and is threaded at —1ª— to receive the closure or cap —2— and the lower end is enlarged at —1ᵇ— and into this enlarged portion is inserted the glass crystal —3— which covers the opening in the plate —4— through which the characters —5ª— on the indicator —5—, are visible. The outer circumference of the portion —1ᵇ— merges into the cylindrical portion —1ᶜ— which may be provided with an integral flange —1ᵈ— by means of which the body may be suitably fastened to the tank, as is represented in Figs. 1 and 2, in which cases the tank is provided with a collar —6— flanged at —6ª— and this flange is reinforced on the under side by the pinch ring —7— and the screws —8— being threaded into this ring, are adapted to draw the gage body flange firmly against the tank collar flange —6ª—. In another form of my invention, Fig. 6, the portion —1ᶜ— of the body —1—, is threaded at its lower end and screws directly into the threaded end of the tank collar —6—. Across the inner circumference of the portion —1ᶜ— of the body —1—, is a bar —1ᵉ— which is perforated to receive the two ends —9ᵇ— of the U shaped float guide —9— and is also perforated to support the revoluble spiral shaft —10— near its upper end. Extending across the inside of the body and above the indicator, are guard spokes —1ᶠ— for protecting the indicator from damage from above and at the same time allowing space for the free passage of fluid into the tank.

The float guide —9— is provided with a bearing seat —9ª— at the center of its bottom bar and the upper ends of the guide are suitably fixed to the bar —1ᵉ— of the gage body.

The float —11— which may be of any suitable material, is provided at the top with the bearing plate —12— which engages the guide —9— to keep the float from turning and this plate is perforated at the center to conform to the cross-sectional shape of the spiral shaft —10— so that as the float rises and falls this plate causes the spiral shaft to turn. The float is also provided with a lower bearing plate —13— which is perforated at the center to allow the spiral shaft to slide freely therethrough and serves as a guide to keep the float in alinement with the shaft to prevent cramping &c.

The spiral shaft —10— has a pivot portion —10ª— at its lower end which is adapted to turn in the bearing seat —9ª— of the guide —9—, and near its upper end it is provided with the cylindrical portion —10ᵇ— which is revolubly fitted in the central perforation of the bar —1ᵉ—. On the upper end of this shaft the indicator —5— is secured so that it revolves with the shaft.

The indicator —5— is provided with indicating characters —5ª— so placed with respect to the spiral shaft and float, that as the characters appear at the center —4ª— of the plate —4— they indicate the amount of liquid remaining in the tank. The indicator is also provided with spokes —5ᵇ— forming openings in the indicator through which the liquid may pass when the tank is being filled.

The glass crystal —3— is securely held in the gage body by the internally flanged ring —14— which is firmly fitted in the seat —1ᵍ— provided for it in the body, and holds the glass under the flange portion of the ring and the glass in turn, presses against the plate —4— to hold it in correct position. The plate —4— could be done away with by coating the under side of the glass —3— with an opaque coating except where it is desired to leave the visual opening.

Having thus described my invention what I claim as new and desire to secure by Letters Patent is—

1. In a fluid gage a body provided with a fluid passage and also provided with an opening through which the indicator is visible; a float guide secured to said body; a float slidably mounted upon said guide; a shaft adapted to be turned by said float; an indicator provided with fluid-passage openings mounted upon said shaft and provided with indicating characters.

2. In a fluid gage a float; a float guide; a shaft adapted to be turned by the float; a member provided with indicating characters mounted upon said shaft; and a gage body adapted to form a fluid passage and provided with an opening through which said characters are visible and with means for supporting said guide and shaft and with means for protecting said indicating member.

3. In a fluid gage a float; a guide for said float; a shaft adapted to be oscillated by the float; an indicator mounted on said shaft provided with indicating characters and with fluid passage openings; a gage body provided with a fluid passage, a support for said guide and shaft, and an opening through which said indicating characters are visible; and a transparent closure for said opening.

4. In a fluid gage a body forming a fluid passage and provided with an indicator observing opening, a revoluble indicator supported within said passage, means within said passage for protecting the indicator, a float for actuating the indicator and a guide for said float.

5. In a fluid gage a body provided with a fluid passage, a support within said passage for a float guide and revoluble indicator, said body also provided with an opening through which the indicator may be observed, means for receiving a closure for the passage, means for protecting the indicator and means for attaching to a tank; a float guide; a float; a revoluble indicator adapted to be turned by the float and provided with indicating means; a closure for said fluid passage and a closure for said indicator reading opening.

6. In a fluid gage a body forming a fluid passage and adapted to support a float guide and indicator; a U shaped guide for a float attached there-to and supporting one end of a revoluble shaft; a revoluble shaft provided with indicating characters; a float adapted to revolve said shaft; and a closure for said fluid passage.

7. In a fluid gage a hollow, cylindrical gage body forming a fluid passage and provided within the passage with a support for a float guide and a revoluble member and with means for protecting the revoluble member and also provided within the wall there-of with an opening through which a portion of the revoluble member is visible.

8. In a fluid gage a hollow, cylindrical gage body forming a fluid passage and provided within the passage with a support for a float guide and a revoluble member and with means for protecting the revoluble member and also provided, within the wall there-of, with an opening through which a portion of the revoluble member is visible; a transparent closure for said opening; a float guide; a float; an indicator adapted to be revolved by the float and a closure for said fluid passage.

9. In a fluid gage a hollow, cylindrical gage body forming a fluid passage and provided, within the passage, with a support for a float guide and a revoluble member and with means for protecting the revoluble member and also provided, within the wall there-of, with an opening through which a portion of the revoluble member is visible; a transparent closure for said opening; a holding ring for securing said transparent closure; a float guide; a float; an indicator adapted to be revolved by the float; and a closure for said fluid passage.

10. In a fluid gage a hollow, cylindrical gage body forming a fluid passage and provided, within the passage, with a support for a float guide and a revoluble member and with means for protecting the revoluble member and also provided, within the wall there-of, with an opening through which a portion of the revoluble member is visible; a transparent closure for said opening; means for restricting the visual opening to a desired size and design; a holding ring for securing said closure; a float guide; a float; an indicator adapted to be revolved by the float; and a closure for said fluid passage.

11. In a fluid gage in combination a ring shaped indicator provided with indicating characters; a body adapted to form a fluid passage opening and provided with a secondary opening through which the indicator may be observed, means for revolubly supporting said indicator within the fluid passage and a float adapted to revolve the indicator.

12. In a fluid gage a cylindrical body forming a fluid passage opening and provided with a secondary opening giving visual access into the passage, a revoluble graduated ring shaped indicator supported within the passage so that the graduations are visible through said secondary opening and a float for actuating said indicator.

In testimony whereof I affix my signature in presence of two witnesses.

HERBERT HASTINGS.

Witnesses:
 ALICE M. JOHANNS,
 EDNA K. BOOTH.